UNITED STATES PATENT OFFICE.

FRANK L. SLOCUM, OF PITTSBURGH, PENNSYLVANIA, ASSIGNOR TO JAMES HENRY REID, OF PITTSBURGH, PENNSYLVANIA.

PREPARATION OF CRUDE MATERIAL FOR MANUFACTURE OF CARBID.

1,319,183. Specification of Letters Patent. Patented Oct. 21, 1919.

No Drawing. Application filed September 21, 1917. Serial No. 192,484.

*To all whom it may concern:*

Be it known that I, FRANK L. SLOCUM, a citizen of the United States, and resident of Pittsburgh, in the county of Allegheny and State of Pennsylvania, have invented a new and useful Improvement in Preparation of Crude Material for Manufacture of Carbid; and I do hereby declare the following to be a full, clear, and exact description thereof.

My invention relates to the preparation of crude material for the manufacture of calcium carbid. It is concerned with the utilization of the residue left after the product formed from the interaction of carbids with nitrogen gas has been treated in such a way as to produce ammonia or its compounds.

A means for effecting the utilization of this material is also provided.

The carbid which may be initially used in my improved process may be of any suitable composition, such for example as the carbid described in the application of Frank L. Slocum, Serial No. 190,620, filed September 10, 1917, or the application of George G. Taylor, Serial No. 190,875, filed September 12, 1917, and such carbid may be treated with nitrogen in any suitable manner, such for example as that described in the application of Taylor above referred to or the application of Frank L. Slocum, Serial No. 190,565, filed September 10, 1917.

For the production of ammonia from said carbid or carbids, any suitable process may be employed, as for example that shown and described in the application of George G. Taylor, Serial No. 191,185, filed September 13, 1917.

The residue produced from the ammonia reaction is then treated in the manner hereinafter described.

This residue which consists for the most part of metal carbonate and oxid together with carbon in the form of graphite is in a state of very fine division, due to the molecular changes caused by the chemical reactions entering into the formation of ammonia from the above-mentioned material.

This extremely finely divided material is especially adapted for the production of carbid by the Reid continuous process in which a crude material is prepared by coking a mixture of metal oxid with bituminous coal or by briqueting a mixture of coke and metal oxid, either of which processes result in the formation of a compact homogeneous mass of oxid and coke which is not segregated during the process of furnacing.

It is obvious that the finer the particles of oxid used in the coal-oxid mixture that is subsequently coked, or the finer the particles of oxid and carbon in the form of coke that are used in the coke-oxid mixture that is subsequently briqueted, the more uniform will be the material produced and consequently the manufacture of carbid will be facilitated and more economically carried on.

In order to most advantageously use this material, it is desirable to calcine it at such a temperature as to expel the larger part of the carbon dioxid from the calcium carbonate therein. This may be done before removal of the material from the appartus in which the ammonia formation takes place, or it may be done after removal of the material.

After calcining it is also necessary to add more carbon to the material to overcome the deficiency in carbon caused by the following reactions; the first of which takes place in the carbid furnace and the other two during the process of calcining.

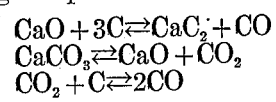

$$CaO + 3C \rightleftarrows CaC_2 + CO$$
$$CaCO_3 \rightleftarrows CaO + CO_2$$
$$CO_2 + C \rightleftarrows 2CO$$

The necessary carbon may be added to this residue by mixing it with bituminous coal and coking the mass or it may be added by mixing the residue with crushed coke and briqueting the mass either with a suitable binder or by other means that may be desirable.

Having described the invention what is claimed is:—

1. The process of obtaining crude material for the manufacture of carbid which consists in treating a nitrified material with steam under conditions of temperature to produce ammonia, calcining the residual carbonate containing material at such a temperature as to expel the larger part of the carbon dioxid from the carbonate therein, and adding sufficient carbon to the calcined material to produce a mixture suitable for the formation of carbid in an electric furnace.

2. The process of obtaining crude material for the manufacture of calcium carbid, which consists in calcining the residual material resulting from the production of ammonia from a nitrified calcium carbid-containing material, at such a temperature as to expel the larger part of the carbon dioxid from the calcium carbonate therein, and adding sufficient carbon to the calcined material to produce a mixture suitable for the formation of carbid in an electric furnace.

3. The process of obtaining crude material for the manufacture of carbid which consists in calcining the residual carbonate-containing material resulting from the production of ammonia from a nitrified material, at such a temperature as to expel the larger part of the carbon dioxid from the carbonate therein, mixing the material with bituminous coal and coking the same to form a cemented mass suitable for treatment in an electric furnace.

In testimony whereof, I the said Frank L. Slocum have hereunto set my hand.

FRANK L. SLOCUM.

Witnesses:
CHARLES R. WRIGHT, Jr.,
FLOYD R. CORNWALL.

Certificate of Correction.

It is hereby certified that Letters Patent No. 1,319,183, granted October 21, 1919, upon the application of Frank L. Slocum, of Pittsburgh, Pennsylvania, for an improvement in "Preparation of Crude Material for Manufacture of Carbid," were erroneously issued to James Henry Reid, of Pittsburgh, Pennsylvania, whereas said Letters Patent should have been issued to *International Nitrogen Company, a Corporation of Delaware*, said corporation being assignee, *by mesne assignments*, of the entire interest in said invention, as shown by the records of assignments in this office; and that the said Letters Patent should be read with this correction therein that the same may conform to the record of the case in the Patent Office.

Signed and sealed this 17th day of April, A. D., 1922.

[SEAL.]
KARL FENNING,
*Acting Commissioner of Patents.*